United States Patent
Kwak et al.

(10) Patent No.: US 12,281,215 B2
(45) Date of Patent: Apr. 22, 2025

(54) PLASTICIZER COMPOSITION, AND SEALANT/ADHESIVE COMPOSITIONS INCLUDING THE SAME

(71) Applicant: Hanwha Solutions Corporation, Seoul (KR)

(72) Inventors: Hee-La Kwak, Daejeon (KR); Jaesong Kim, Daejeon (KR); Myung-Ik Yoo, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 0 days.

(21) Appl. No.: 17/674,981

(22) Filed: Feb. 18, 2022

(65) Prior Publication Data

US 2022/0259401 A1 Aug. 18, 2022

(30) Foreign Application Priority Data

Feb. 18, 2021 (KR) .................. 10-2021-0021872

(51) Int. Cl.
| | | |
|---|---|---|
| *C08L 33/08* | (2006.01) | |
| *C08K 5/101* | (2006.01) | |
| *C09J 11/06* | (2006.01) | |
| *C09J 131/04* | (2006.01) | |
| *C09J 133/08* | (2006.01) | |

(52) U.S. Cl.
CPC ............ *C08K 5/101* (2013.01); *C08L 33/08* (2013.01); *C09J 11/06* (2013.01); *C09J 131/04* (2013.01); *C09J 133/08* (2013.01)

(58) Field of Classification Search
CPC .......... C08L 33/08; C08K 5/105; C08K 5/109
See application file for complete search history.

(56) References Cited

U.S. PATENT DOCUMENTS

| | | | |
|---|---|---|---|
| 2011/0040001 A1 | 2/2011 | Gosse et al. | |
| 2011/0263770 A1* | 10/2011 | Yoon ...................... | C08K 5/092 |
| | | | 524/285 |
| 2018/0298161 A1* | 10/2018 | Kim ......................... | C08K 5/12 |
| 2019/0161597 A1 | 5/2019 | Pfeiffer et al. | |
| 2020/0131332 A1 | 4/2020 | McBride et al. | |

FOREIGN PATENT DOCUMENTS

| | | | | |
|---|---|---|---|---|
| CN | 001182769 | | 5/1998 | |
| CN | 001216552 | | 5/1999 | |
| CN | 102703010 | | 10/2012 | |
| CN | 102952492 | | 3/2013 | |
| CN | 103044829 | | 4/2013 | |
| CN | 103044863 | | 4/2013 | |
| CN | 103304418 A | * | 9/2013 | .......... C07C 67/303 |
| CN | 104704077 | | 6/2015 | |
| CN | 109134926 | * | 1/2019 | .............. C08K 5/00 |
| CN | 109134926 A | * | 1/2019 | ............. C08K 5/103 |
| EP | 2810982 | | 12/2014 | |
| JP | 4357263 | | 11/2009 | |
| JP | 2015-217608 | | 12/2015 | |
| KR | 2005-0016207 | | 2/2005 | |
| KR | 2126969 | | 6/2020 | |
| KR | 20220113099 A | * | 2/2021 | ............... C08K 5/12 |

OTHER PUBLICATIONS

KR20220113099A English Translation (Year: 2021).*
CN103304418 English Translation (Year: 2013).*
CN109134926 English translation (Year: 2019).*
CN109134926A ENglish translation (Year: 2019).*

\* cited by examiner

*Primary Examiner* — Catherine S Branch
*Assistant Examiner* — Huihong Qiao
(74) *Attorney, Agent, or Firm* — LEX IP MEISTER, PLLC

(57) ABSTRACT

This invention relates to a plasticizer composition that is environmentally-friendly, and yet exhibits excellent viscosity control, processability, low temperature properties, and migration resistance, and an adhesive composition including the same.

13 Claims, No Drawings

PLASTICIZER COMPOSITION, AND SEALANT/ADHESIVE COMPOSITIONS INCLUDING THE SAME

TECHNICAL FIELD

This invention relates to a plasticizer composition that does not include a phthalate plasticizer, and thus is environmentally-friendly, and yet exhibits excellent viscosity control and low temperature properties, and has a small change in viscosity with the passage of time, and a sealant and/or adhesive composition including the same.

BACKGROUND OF ART

As a polymer additive, a plasticizer is used to control hardness or softness, endow fouling resistance, and modify tensile properties (for example, strength, elongation, or elasticity) and processability.

In general, an adhesive or sealant composition used in the field of architecture, civil engineering, and the like includes a plasticizer together with resin such as polyacrylate, and the like, as main components. The plasticizer used in the adhesive or sealant composition decreases hardness of polymer, commercializes a mixture of polymer and filler, increases low temperature elasticity, and increases elongation of the prepared film.

Meanwhile, previously, as plasticizers for adhesive or sealant compositions, phthalate-based plasticizers such as dibutyl phthalate (DBP), which can increase processability due to easiness of viscosity control, and improve cold resistance due to the lowering of glass transition temperature, have been mainly used. However, a phthalate-based plasticizer is an endocrine disrupter that interferes with or disturbs the hormone action of human and is suspected of environmental hormone, and thus, there is a movement to regulate the same.

Thus, there is a demand for development of non-phthalate-based plasticizers that have properties equivalent to or more excellent than those of phthalate-based plasticizers, and yet, are environmentally-friendly, as an alternative of phthalate-based plasticizers.

DETAILED DESCRIPTION OF THE INVENTION

Technical Problem

It is an object of the invention to provide a plasticizer composition that does not include a phthalate-based plasticizer, and thus is environmentally-friendly, and yet can realize properties equivalent to or more excellent than those of the existing phthalate-based plasticizers, and a sealant and/or adhesive composition including the same.

Technical Solution

According to one embodiment of the invention, there is provided a plasticizer composition including:
a cyclohexane-1,4-dicarboxylate-based compound;
a cyclohexane-1,2-dicarboxylate-based compound; and
a benzoate-based compound,
wherein the benzoate-based compound is included in the content of less than 60 parts by weight, based on 100 parts by weight of the plasticizer composition.

According to another embodiment of the invention, there is provided an adhesive composition including: one or more polymers selected from the group consisting of polyvinyl acetate, ethylene vinyl acetate, and poly(meth)acrylate; and the plasticizer composition of the invention.

Effect of the Invention

The plasticizer composition of the invention does not include a phthalate plasticizer, and thus is environmentally-friendly, and yet exhibits viscosity control effect appropriate for use in an adhesive composition, and has a small change in viscosity with the passage of time, and excellent cold resistance. The plasticizer composition of the invention can be usefully used as the plasticizer of an adhesive or sealant composition requiring high workability and excellent low temperature properties.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Plasticizer Composition

The plasticizer composition of the invention includes a cyclohexane-1,4-dicarboxylate-based compound; a cyclohexane-1,2-dicarboxylate-based compound; and a benzoate-based compound, and due to the interactions therebetween, has an excellent viscosity control effect and cold resistance, and exhibits a small change in viscosity even during long term storage.

The cyclohexane-1,4-dicarboxylate-based compound has excellent low temperature properties, and thus, has the effect of lowering the glass transition temperature (Tg) of the plasticizer composition. However, if it is used alone, the viscosity may be too low, and a viscosity change rate may be high during long term storage, and thus, it is not appropriate for use as the plasticizer of a adhesive or sealant requiring thickening to a certain degree.

Meanwhile, although a cyclohexane-1,2-dicarboxylate-based compound and a benzoate-based compound have excellent low temperature properties and have a small change in viscosity with the passage of time, they have high viscosity and thus inferior workability.

Thus, in the present disclosure, by using the three kinds of compounds in combination, disadvantages may be compensated while maintaining each advantage. Namely, in the present disclosure, by simultaneously including three kinds of compounds, but controlling the content of the benzoate-based compound to less than 60 parts by weight based on 100 parts by weight of the total plasticizer composition, excellent low temperature properties and viscosity properties suitable for an adhesive/sealant may be realized. And, the plasticizer composition of the invention has a small change in viscosity with the passage of time, and thus may exhibit stable performance even during long term storage.

Hereinafter, each component of the plasticizer composition will be explained in detail.

Cyclohexane-1,4-dicarboxylate-Based Compound

The cyclohexane-1,4-dicarboxylate-based compound included in the plasticizer composition of the invention is an ester compound derived from cyclohexane-1,4-dicarboxylic acid, and is represented by the following Chemical Formula 1.

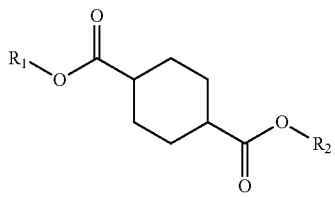

[Chemical Formula 1]

In the Chemical Formula 1, $R_1$ and $R_2$ are each independently a C4 to 12 linear or branched alkyl.

Although the cyclohexane-1,4-dicarboxylate-based compound has a disadvantage of a large change in viscosity with the passage of time, since it has low viscosity and a rapid gelling speed, when used in combination with a cyclohexane-1,2-dicarboxylate-based compound and a benzoate-based compound, excellent properties may be exhibited.

In the Chemical Formula 1, $R_1$ and $R_2$ are each independently butyl, isobutyl, pentyl, hexyl, heptyl, 2-ethylhexyl, octyl, nonyl, isononyl, 2-propylheptyl, decyl, or isodecyl.

Preferably, $R_1$ and $R_2$ are each independently, butyl, 2-ethylhexyl, or isononyl.

Preferably, the cyclohexane-1,4-dicarboxylate-based compound represented by the Chemical Formula 1 is one or more selected from the group consisting of di(2-ethylhexyl)cyclohexane-1,4-dicarboxylate, diisononylcyclohexane-1,4-dicarboxylate, diisodecylcyclohexane-1,4-dicarboxylate, butyl(2-ethylhexyl)cyclohexane-1,4-dicarboxylate, and dibutylcyclohexane-1,4-dicarboxylate.

According to one preferable embodiment, the cyclohexane-1,4-dicarboxylate-based compound may be di(2-ethylhexyl)cyclohexane-1,4-dicarboxylate (DEHCH).

The content of the cyclohexane-1,4-dicarboxylate-based compound may be 30 parts by weight or more, or 40 parts by weight or more, and 70 parts by weight or less, or 60 parts by weight or less, based on 100 parts by weight of the plasticizer composition.

If the content of the cyclohexane-1,4-dicarboxylate-based compound is less than 30 parts by weight, based on 100 parts by weight of the plasticizer composition, the contents of the cyclohexane-1,2-dicarboxylate-based compound and benzoate-based compound having high viscosities may increase, and thus, the viscosity of the plasticizer composition may become excessively high. To the contrary, if the content of the cyclohexane-1,4-dicarboxylate-based compound exceeds 70 parts by weight, based on 100 parts by weight of the plasticizer composition, viscosity may become excessively low, and a viscosity change rate with the passage of time may increase.

Cyclohexane-1,2-dicarboxylate-Based Compound

The cyclohexane-1,2-dicarboxylate-based compound included in the plasticizer composition of the invention is an ester compound derived from cyclohexane-1,2-dicarboxylic acid, and is represented by the following Chemical Formula 2:

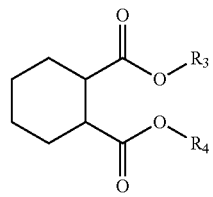

[Chemical Formula 2]

In the Chemical Formula 2, $R_3$ and $R_4$ are each independently C4 to 12 linear or branched alkyl.

Although the cyclohexane-1,2-dicarboxylate-based compound has high viscosity and thus if used alone, processability may be lowered, since it has excellent low temperature properties and change in viscosity with the passage of time, when used in combination with a cyclohexane-1,4-dicarboxylate-based compound and a benzoate-based compound, excellent properties may be realized.

In the Chemical Formula 2, $R_3$ and $R_4$ each independently butyl, isobutyl, pentyl, hexyl, heptyl, 2-ethylhexyl, octyl, nonyl, isononyl, 2-propylheptyl, decyl, or isodecyl.

Preferably, $R_3$ and $R_4$ are each independently butyl, 2-ethylhexyl, or isononyl.

Preferably, the cyclohexane-1,2-dicarboxylate-based compound represented by the Chemical Formula 2 is one or more selected from the group consisting of dibutylcyclohexane-1,2-dicarboxylate, diisononylcyclohexane-1,2-dicarboxylate, di(2-ethylhexyl)cyclohexane-1,2-dicarboxylate, and diisodecylcyclohexane-1,2-dicarboxylate.

According to one preferable embodiment, the cyclohexane-1,2-dicarboxylate-based compound may be dibutylcyclohexane-1,2-dicarboxylate (DBCH).

The cyclohexane-1,2-dicarboxylate-based compound may be included in the content of 10 parts by weight or more, or 20 parts by weight or more, and 60 parts by weight or less, 50 parts by weight or less, 40 parts by weight or less, or 30 parts by weight or less, based on 100 parts by weight of the plasticizer composition.

If the content of the cyclohexane-1,2-dicarboxylate-based compound is less than 10 parts by weight, based on 100 parts by weight of the plasticizer composition, the viscosity change rate with the passage of time may increase, and if it exceeds 60 parts by weight, the viscosity of the plasticizer composition may become excessively high, and thus it is preferable to meet the above range.

Benzoate-Based Compound

The benzoate-based compound included in the plasticizer composition of the invention means a compound including one or more benzoate groups (PhCOO—, Ph is phenyl) in the molecule.

Specifically, the benzoate-based compound may be one or more selected from the group consisting of compounds represented by the following Chemical Formula 3-1, compounds represented by the following Chemical Formula 3-2, and compounds represented by the following Chemical Formula 3-3.

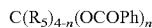
[Chemical Formula 3-1]

In the Chemical Formula 3-1, n is an integer of 1 to 3, $R_5$'s are each independently, hydrogen, or a C4 to 20 linear or branched alkyl, and Ph is phenyl.

[Chemical Formula 3-2]

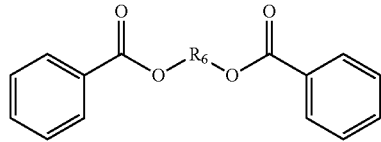

In the Chemical Formula 3-2, $R_6$ is a C2 to 20 linear, branched, or cyclic alkylene, a C6 to 20 arylene, or a C2 to 20 alkylene oxyalkylene.

[Chemical Formula 3-3]

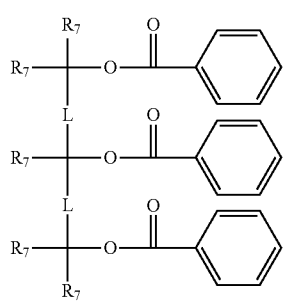

In the Chemical Formula 3-3,

L's are each independently a single bond, a C1 to 6 linear, branched, or a cyclic alkylene, $R_7$'s are each independently hydrogen, a C1 to 20 linear, branched, or cyclic alkyl, or a C6 to 20 aryl.

Preferably, $R_5$ may be a hexyl, heptyl, 2-ethylhexyl, octyl, nonyl, isononyl, 2-propylheptyl, decyl, or isodecyl group.

Preferably, n may be 1.

Preferably, $R_6$ may be a C2 to 8 linear, branched, or cyclic alkylene, C6 to 12 arylene, or a C4 to 6 alkylene oxyalkylene. The alkylene oxyalkylene represents a structure of -alkylene-O-alkylene-, wherein each alkylene group may be linear, branched, or cyclic.

More preferably, $R_6$ may be an ethylene, propylene, isopropylene, butylene, pentylene, hexylene, phenylene, ethylene oxyethylene, or propylene oxypropylene group.

Preferably, all L's may be a single bond.

Preferably, $R_7$'s may each independently be hydrogen, methyl, or ethyl, and more preferably, all may be hydrogen.

Preferably, the benzoate-based compound may be one or more selected from the group consisting of isodecyl benzoate, isononyl benzoate, 2-ethylhexyl benzoate, di(ethylene glycol) dibenzoate, di(propylene glycol) dibenzoate, 1,2-propanediol dibenzoate, 1,3-propanediol dibenzoate, 1,4-butanediol dibenzoate, 1,5-pentanediol dibenzoate, 1,6-hexanediol dibenzoate, resorcinol dibenzoate, and glyceryl tribenzoate. The di(propylene glycol) dibenzoate includes three kinds of isomers, namely 3,3'-oxybis-1-propanol dibenzoate, 2,2'-oxybis-1-propanol dibenzoate, and 1,1'-oxybis-2-propanol dibenzoate.

More preferably, the benzoate-based compound may be one or more selected from the group consisting of isodecyl benzoate, isononyl benzoate, 2-ethylhexylbenzoate, di(ethylene glycol) dibenzoate, di(propylene glycol) dibenzoate, 1,2-propanediol dibenzoate, 1,3-propanediol dibenzoate, and resorcinol dibenzoate.

Although the benzoate-based compound has a low viscosity change rate with the passage of time and thus has excellent stability, if used alone, low temperature properties may be inferior, and workability may be lowered due to high viscosity. Thus, in the present disclosure, by using the benzoate-based compound in combination of the above-explained cyclohexane-1,4-dicarboxylate-based compound and cyclohexane-1,2-dicarboxylate-based compound, and controlling the content of the benzoate-based compound to less than 60 parts by weight based on 100 parts by weigh of the plasticizer composition, excellent low temperature properties and optimum viscosity of the plasticizer composition may be realized.

Preferably, the benzoate-based compound may be included in the content of 10 parts by weight or more, or 20 parts by weight or more, and 50 parts by weight or less, or 40 parts by weight or less, based on 100 parts by weigh of the plasticizer composition. When the content of the benzoate-based compound is within the above range, appropriate viscosity as a plasticizer may be exhibited, and viscosity change may be small even during long term storage, and excellent low temperature stability may be exhibited.

According to one preferable embodiment, the plasticizer composition may include di(2-ethylhexyl)cyclohexane-1,4-dicarboxylate as the cyclohexane-1,4-dicarboxylate-based compound, dibutylcyclohexane-1,2-dicarboxylate as the cyclohexane-1,2-dicarboxylate-based compound, and di(propylene glycol) dibenzoate as the benzoate-based compound.

And, according to one preferable embodiment, the plasticizer composition may consist of di(2-ethylhexyl)cyclohexane-1,4-dicarboxylate, dibutylcyclohexane-1,2-dicarboxylate, and di(propylene glycol) dibenzoate.

Herein, the plasticizer composition may include, based on 100 parts by weight of the plasticizer composition, 40 to 60 parts by weight of di(2-ethylhexyl)cyclohexane-1,4-dicarboxylate, 20 to 40 parts by weight of dibutylcyclohexane-1,2-dicarboxylate, and 20 to 40 parts by weight of di(propylene glycol) dibenzoate.

The above-explained plasticizer composition of the invention simultaneously includes three kinds of compounds of a cyclohexane-1,4-dicarboxylate-based compound, a cyclohexane-1,2-dicarboxylate-based compound, and a benzoate-based compound, thus exhibiting an excellent thickening effect, cold resistance, and stability of viscosity with the passage of time. Thus, the plasticizer composition may be appropriately used as the plasticizer of a sealant or adhesive composition requiring excellent workability, cold resistance, and stability. And, since the plasticizer composition does not include a phthalate-based plasticizer, it may be used as an environmentally-friendly plasticizer.

Sealant/Adhesive Composition

According to another embodiment of the invention, there is provided a composition including: one or more polymers selected from the group consisting of polyvinyl acetate, ethylene vinyl acetate, and poly(meth)acrylate; and the above-explained plasticizer composition of the invention. The composition may be used as a sealant or adhesive composition.

The polymer may be in the form of an emulsion prepared through emulsion polymerization, for example.

The plasticizer composition included in the sealant or adhesive composition is as explained above.

The content of the plasticizer composition may be 5 parts by weight or more, or 10 parts by weight or more, and 50 parts by weight or less, 40 parts by weight or less, or 30 parts by weight or less, based on 100 parts by weight of the sealant or adhesive composition. If the content of the plasticizer composition is less than 5 parts by weight, a sufficient plasticization effect may not be obtained, and if it exceeds 50 parts by weight, the composition may not be cured, and migration of a plasticizer may be generated.

Since the sealant or adhesive composition includes a plasticizer composition including a cyclohexane-1,4-dicarboxylate-based compound, a cyclohexane-1,2-dicarboxylate-based compound, and a benzoate-based compound, it has excellent workability, has a low glass transition temperature and thus excellent cold resistance, and has a small change in viscosity with the passage of time and thus excellent stability.

For example, the sealant or adhesive composition fulfills viscosity at 25° C. of 30,000 to 45,000 cps, or 32,000 to 42,000 cps, and thus, has excellent processability, and thus, it can be appropriately used for sealant and/or adhesive, particularly for furniture, woodworking, and the like. The viscosity may be measured using viscometer (for example, Brookfield viscometer) as described later in Examples.

And, the sealant or adhesive composition has a glass transition temperature (Tg) of −20° C. or less, or −21° C. or less, thus exhibiting excellent low temperature properties.

As such, the sealant or adhesive composition of the invention, compared to the existing sealant or adhesive composition, is environmentally-friendly, and yet has excellent processability, long term storage stability, cold resistance, and the like, and thus it can be appropriately used for an adhesive or sealant for furniture, woodworking, and the like.

Hereinafter, the invention will be explained in more detail through examples. However, there examples are presented only as the illustrations of the invention, and the scope of the invention is not limited thereby. And, in the following examples and comparative examples, "%" and "parts" indicating contents are based on weights, unless specifically mentioned.

EXAMPLE

Example 1

Di(2-ethylhexyl)cyclohexane-1,4-dicarboxylate (DEHCH), dibutylcyclohexane-1,2-dicarboxylate (DBCH), and di(propylene glycol) dibenzoate (DPGDB, Eastman company Benzoflex 9-88, CAS no. 27138-31-4) were mixed at the weight ratio of 40:30:30 to prepare the plasticizer composition of Example 1.

To 100 parts by weight of vinyl acetate emulsion (Wacker Chemical, VINNAPAS EP 706K), 10 parts by weight of the above prepared plasticizer composition were added and mixed at room temperature for 1 hour at a speed of 600 rpm, to prepare the adhesive composition of Example 1.

Example 2

The plasticizer composition of Example 2 was prepared using DEHCH:DBCH:DPGDB at the weight ratio of 40:20:40.

Using the plasticizer composition, the adhesive composition of Example 2 was prepared by the same method as Example 1.

Comparative Example 1

The adhesive composition of Comparative Example 1 was prepared by the same method as Example 1, except that DEHCH was used alone as a plasticizer.

Comparative Example 2

The adhesive composition of Comparative Example 2 was prepared by the same method as Example 1, except that DBCH was used alone as a plasticizer.

Comparative Example 3

The adhesive composition of Comparative Example 3 was prepared by the same method as Example 1, except that DPGDB was used alone as a plasticizer.

Comparative Example 4

The plasticizer composition of Comparative Example 4 was prepared by mixing DEHCH and DBCH at the weight ratio of 40:60.

Using the plasticizer composition, the adhesive composition of Comparative Example 4 was prepared by the same method as Example 1.

Comparative Example 5

The plasticizer composition of Comparative Example 5 was prepared by mixing DEHCH and DPGDB at the weight ratio of 70:30.

Using the plasticizer composition, the adhesive composition of Comparative Example 5 was prepared by the same method as Example 1.

Comparative Example 6

The plasticizer composition of Comparative Example 6 was prepared by mixing DEHCH:DBCH:DPGDB at the weight ratio of 20:20:60.

Using the plasticizer composition, the adhesive composition of Comparative Example 6 was prepared by the same method as Example 1.

Experimental Example

For each adhesive composition of the examples and comparative examples, glass transition temperature, viscosity after 1 day from preparation, and viscosity after 3 weeks from preparation were evaluated, and the results are summarized in the following Table 1.

(1) Glass Transition Temperature (Tg)

A glass transition temperature was measured using DSC (Differential Scanning Calorimetry), at −80° C. to 80° C. at a temperature rise speed of 20° C./min.

(2) Viscosity

For each adhesive composition of the examples and comparative examples, viscosity after being stabilized at 25° C. for one day, and viscosity after being left at 25° C. for three weeks, were measured with a Brookfield viscometer (#6 spindle, 10 rpm).

TABLE 1

| | Plasticizer composition (weight ratio) | Properties of adhesive composition | | | |
| --- | --- | --- | --- | --- | --- |
| | | Tg (° C.) | Viscosity after 1 day @25° C. (cps) | Viscosity after 3 weeks @25° C. (cps) | Viscosity change (%) |
| Example 1 | DEHCH:DBCH:DPGDB = 40:30:30 | −21 | 33138 | 41710 | 25.9 |
| Example 2 | DEHCH:DBCH:DPGDB = 40:20:40 | −21 | 32872 | 41880 | 27.4 |
| Comparative Example 1 | DEHCH | −20 | 16800 | 31000 | 84.5 |
| Comparative Example 2 | DBCH | −21 | 45360 | 59400 | 30.9 |
| Comparative Example 3 | DPGDB | −10 | 42700 | 49700 | 16.4 |
| Comparative Example 4 | DEHCH:DBCH = 40:60 | −18 | 38800 | 56000 | 44.3 |
| Comparative Example 5 | DEHCH:DPGDB = 70:30 | −18 | 21150 | 36250 | 71.4 |
| Comparative Example 6 | DEHCH:DBCH:DPGDB = 20:20:60 | −14 | 40500 | 47500 | 17.3 |

Referring to Table 1, it can be confirmed that the adhesive composition including the plasticizer composition of the invention, which includes a cyclohexane-1,4-dicarboxylate-based compound, a cyclohexane-1,2-dicarboxylate-based compound, and a benzoate-based compound, wherein the content of the benzoate-based compound is less than 60 parts by weight, has a low glass transition temperature, and thus has excellent cold resistance, exhibits viscosity appropriate for processing, and has a small change in viscosity with the passage of time.

The invention claimed is:
1. A plasticizer composition comprising:
  a cyclohexane-1,4-dicarboxylate-based compound;
  a cyclohexane-1,2-dicarboxylate-based compound; and
  a benzoate-based compound,
  wherein the benzoate-based compound is included in the content of 30 to 50 parts by weight, based on 100 parts by weight of the plasticizer composition.
2. The plasticizer composition according to claim 1, wherein the cyclohexane-1,4-dicarboxylate-based compound is one or more selected from the group consisting of di(2-ethylhexyl)cyclohexane-1,4-dicarboxylate, diisononylcyclohexane-1,4-dicarboxylate, diisodecylcyclohexane-1,4-dicarboxylate, butyl(2-ethylhexyl)cyclohexane-1,4-dicarboxylate, and dibutylcyclohexane-1,4-dicarboxylate.
3. The plasticizer composition according to claim 1, wherein the cyclohexane-1,2-dicarboxylate-based compound is one or more selected from the group consisting of dibutylcyclohexane-1,2-dicarboxylate, diisononylcyclohexane-1,2-dicarboxylate, di(2-ethylhexyl)cyclohexane-1,2-dicarboxylate, and diisodecylcyclohexane-1,2-dicarboxylate.
4. The plasticizer composition according to claim 1, wherein the benzoate-based compound is one or more selected from the group consisting of isodecylbenzoate, isononylbenzoate, 2-ethylhexylbenzoate, di(ethylene glycol) dibenzoate, di(propylene glycol) dibenzoate, 1,2-propanediol dibenzoate, 1,3-propanediol dibenzoate, 1,4-butanediol dibenzoate, 1,5-pentanediol dibenzoate, 1,6-hexanediol dibenzoate, resorcinol dibenzoate, and glyceryl tribenzoate.
5. The plasticizer composition according to claim 1, wherein the cyclohexane-1,4-dicarboxylate-based compound is included in the content of 30 to 70 parts by weight, based on 100 parts by weight of the plasticizer composition.
6. The plasticizer composition according to claim 1, wherein the cyclohexane-1,2-dicarboxylate-based compound is included in the content of 10 to 60 parts by weight, based on 100 parts by weight of the plasticizer composition.
7. The plasticizer composition according to claim 1, wherein the benzoate-based compound is included in the content of 30 to 40 parts by weight, based on 100 parts by weight of the plasticizer composition.
8. The plasticizer composition according to claim 1, wherein the cyclohexane-1,4-dicarboxylate-based compound is di(2-ethylhexyl)cyclohexane-1,4-dicarboxylate,
  the cyclohexane-1,2-dicarboxylate-based compound is dibutylcyclohexane-1,2-dicarboxylate, and
  the benzoate-based compound is di(propylene glycol) dibenzoate.
9. A composition comprising:
  one or more polymers selected from the group consisting of polyvinyl acetate, ethylene vinyl acetate, and poly(meth)acrylate; and
  the plasticizer composition of claim 1.
10. The composition according to claim 9, wherein the plasticizer composition is included in the content of 5 to 50 parts by weight, based on 100 parts by weight of the composition.

11. The composition according to claim 9, wherein the composition has viscosity at 25° C. of 30,000 to 45,000 cps.

12. The composition according to claim 9, wherein the composition has a glass transition temperature of −20° C. or less.

13. The composition according to claim 9, wherein the composition is used as a sealant or adhesive.

\* \* \* \* \*